No. 617,124. Patented Jan. 3, 1899.
A. J. ROBINSON.
MEANS FOR SECURING LEVER ARMS TO THEIR SHAFTS.
(Application filed June 16, 1898.)
(No Model.)

Attest:
F. E. Caller
E. W. Waite

Inventor,
Andrew J. Robinson;
By A. B. Upham,
Attorney in fact.

THE NORRIS PETERS CO., PHOTO-LITHO., WASHINGTON, D. C.

UNITED STATES PATENT OFFICE.

ANDREW J. ROBINSON, OF BOSTON, MASSACHUSETTS, ASSIGNOR TO THE XNTRIC VALVE COMPANY, OF PORTLAND, MAINE.

MEANS FOR SECURING LEVER-ARMS TO THEIR SHAFTS.

SPECIFICATION forming part of Letters Patent No. 617,124, dated January 3, 1899.

Application filed June 16, 1898. Serial No. 683,592. (No model.)

*To all whom it may concern:*

Be it known that I, ANDREW J. ROBINSON, a citizen of the United States, residing at Boston, in the county of Suffolk and State of Massachusetts, have invented a new and useful Means for Securing Lever-Arms to Their Shafts, of which the following is a full, clear, and exact description.

The object of this invention is the construction of improved means whereby an actuating-arm can be easily and economically connected with a rocking shaft and as readily disconnected therefrom when desired.

Figure 1:
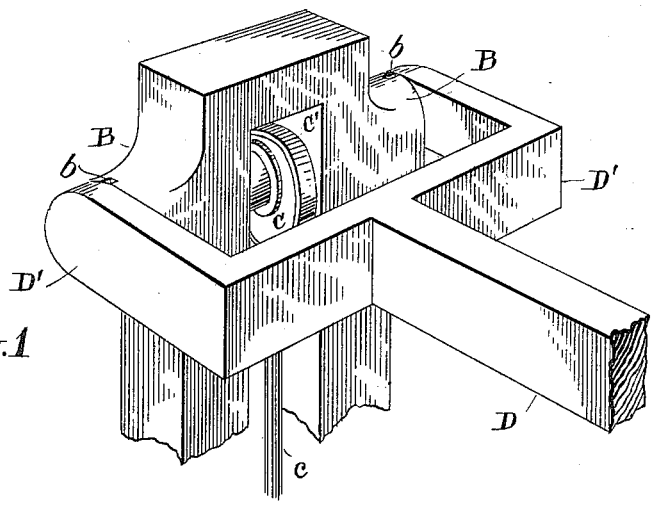
Figures 2, 3, 4:
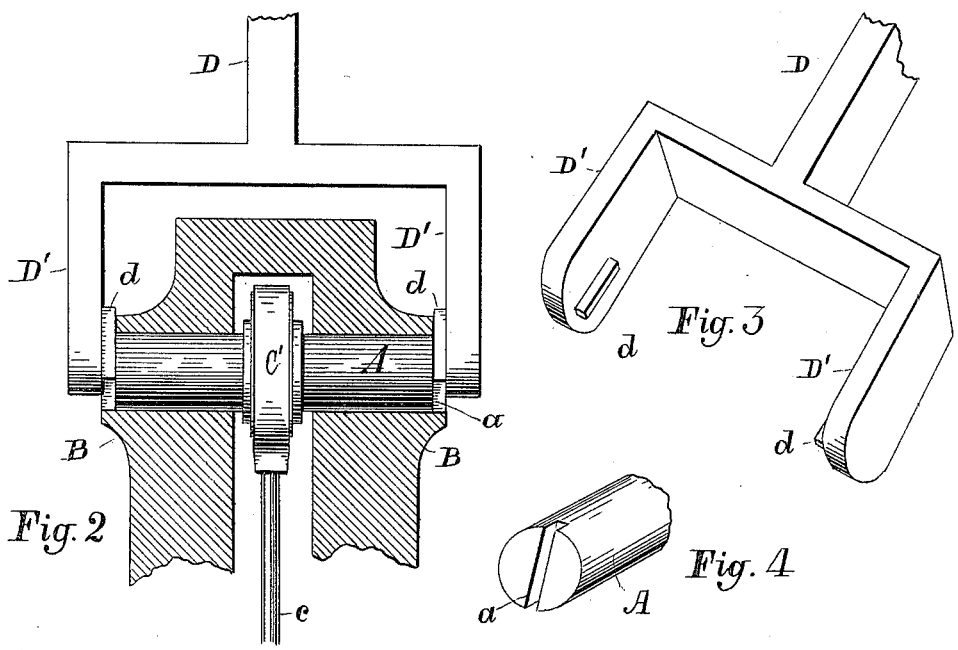
Figure 5:
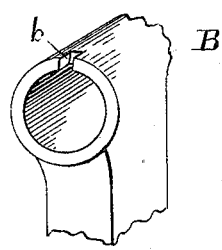

Referring to the drawings forming part of this specification, Figure 1 is a perspective view of a mechanism embodying my invention. Fig. 2 is a vertical central section thereof with the actuating-arm in a condition of partial removal. Fig. 3 is a perspective view of the actuating-arm. Fig. 4 is a detail perspective view of an end of the rocking shaft, and Fig. 5 is a detail perspective view of one end of the bearings for said shaft.

In the construction illustrated, A is a short rocking shaft, the rocking motion of which is adapted to communicate a reciprocating movement to a connecting-rod $c$ through the agency of an eccentric C, fixed upon said shaft, and an eccentric-strap C', joining said eccentric to said rod. Said shaft is loosely held in the bearings or boxes B, suitably bound together and supported and having space between them for said eccentric and its allied parts.

At each end of the shaft A is a diametrical groove $a$, as shown in Fig. 4, and in the upper periphery of the outer end of each box B is a notch $b$, corresponding in depth and width to said grooves.

The actuating lever or arm D is made with a bifurcation or fork D' just equal in span to the length of said shaft and formed with the feather $d$ on the inner face of each leg of the fork, as shown in Fig. 3.

By turning the shaft A until its grooves $a$ are in alinement with the notches $b$ and holding the lever D in a vertical or other required position the said fork can be slid downward over the ends of the shaft and bearing-boxes, with the said feathers or splines $d$ entering the said notches and grooves, as indicated in Fig. 2; but since the length of each feather is made slightly less than or equal to the diameter of the shaft A so soon as the ends of the feathers reach the lower surface of the bearings the upper ends thereof come within such bearing-surface, and the lever D can now be swung down into a horizontal position—that shown in Fig. 1. In this latter position or in any position other than the vertical one previously described the fork is securely held in the bearings, and by means of the feathers and their engagement with the grooves $a$ every swing of the lever D communicates a corresponding rocking motion to the shaft A and the desired reciprocation to the rod $c$. As will be apparent, this construction is both efficient and simple. There are no screws, bolts, nuts, and pins to unloosen. The fork serves to retain the shaft in the proper position longitudinally, the bearings hold the fork in place, and after having once been made according to gage all the parts can be thrown together without further fitting or fussing. With this construction if it is wished to shift the eccentric and change its stroke the lever D can be removed, the shaft A revolved one hundred and eighty degrees, and then the said lever replaced.

It is of course clear that one of the legs of the fork D' alone is sufficient to actuate the shaft A, but that the two are employed for the reason that each serves as a means for preventing the removal of the other in the direction of the length of the shaft. In other words, without one the other will not remain with its feather in the groove of the shaft.

Although I have described this movement as applied to a device for transmitting the oscillation of a lever into a reciprocative motion, I do not restrict myself thereto, as it is capable of many other applications; but What I do claim, and for which I desire Letters Patent, is as follows, to wit:

1. The combination of a shaft having a diametrical groove in its end, a bearing for said shaft having a terminal notch corresponding to said groove, the lever having the feather or spline adapted to enter said groove through said notch, and means for preventing the removal of said lever in the direction of the length of said shaft, whereby said lever can be put into an actuating relation with respect to said shaft when said notch and groove are in alinement, but cannot be removed therefrom after said lever and shaft have been turned through a limited arc, substantially as and for the purpose set forth.

2. The combination of the shaft having the diametrical groove in each end, the bearing for said shaft having the terminal notches corresponding to said grooves, and the lever having the fork straddling said bearing and formed with the feathers or splines fitting said grooves, substantially as and for the purpose set forth.

3. In a mechanism for converting oscillatory into reciprocating motion, the combination of the shaft having the diametrical groove in each end, the separated bearings for said shaft formed with the notched edges, the lever having the fork straddling the said bearings and having the feathers or splines fitting said grooves, the eccentric on said shaft, and the eccentric strap and rod, substantially as and for the purpose set forth.

In testimony that I claim the foregoing invention I have hereunto set my hand this 14th day of June, 1898.

ANDREW J. ROBINSON.

Witnesses:
 A. B. UPHAM,
 CHAS. J. MCCARTHY.